United States Patent
Philipp

(10) Patent No.: US 12,180,015 B2
(45) Date of Patent: Dec. 31, 2024

(54) MULTI-TRACK LOADING OF PICK-AND-PLACE ROBOTS

(71) Applicant: ROTZINGER AG, Kaiseraugst (CH)

(72) Inventor: Kurt Philipp, Grenzach-Wyhlen (DE)

(73) Assignee: ROTZINGER AG, Kaiseraugst (CH)

( * ) Notice: Subject to any disclaimer, the term of this patent is extended or adjusted under 35 U.S.C. 154(b) by 165 days.

(21) Appl. No.: 17/621,518

(22) PCT Filed: Jun. 26, 2020

(86) PCT No.: PCT/EP2020/067994
§ 371 (c)(1),
(2) Date: Dec. 21, 2021

(87) PCT Pub. No.: WO2020/260562
PCT Pub. Date: Dec. 30, 2020

(65) Prior Publication Data
US 2022/0348418 A1 Nov. 3, 2022

(30) Foreign Application Priority Data
Jun. 27, 2019 (CH) .............................. CH00857/19

(51) Int. Cl.
*B65G 1/04* (2006.01)
*B65G 47/51* (2006.01)

(52) U.S. Cl.
CPC ....... *B65G 47/5109* (2013.01); *B65G 1/0435* (2013.01)

(58) Field of Classification Search
CPC .......................... B65G 47/5109; B65G 1/0435
(Continued)

(56) References Cited

U.S. PATENT DOCUMENTS 8,397,898 B2 * 3/2013 Buchmann ......... B65G 47/5186
198/720
8,397,989 B2 * 3/2013 Wengrovitz ........... G06Q 30/02
235/384
(Continued)

FOREIGN PATENT DOCUMENTS

CN 108217038 A 6/2018
DE 10 2009 051 792 A1 5/2011
(Continued)

OTHER PUBLICATIONS

Takashi, Stacker Crane and Article Storage Facility, JP2010047336 (Year: 2010).*
(Continued)

*Primary Examiner* — Gene O Crawford
*Assistant Examiner* — Lester Rushin, III
(74) *Attorney, Agent, or Firm* — Birch, Stewart, Kolasch & Birch, LLP

(57) ABSTRACT

The loading of one or more multi-track pick-and-place devices with formations of products from an interim store including buffer-storage belts arranged in a number of planes takes place by means of a lifting device arranged at the exit of the interim store. The lifting device has a height-adjustable platform, on which conveyor belts which run transversely to the conveying direction of the buffer-storage belts are arranged. The conveyor belts can be displaced horizontally in the conveying direction of the buffer-storage belts and can be rotated through an angle between 0° and 90°.

17 Claims, 9 Drawing Sheets

Figure 1:
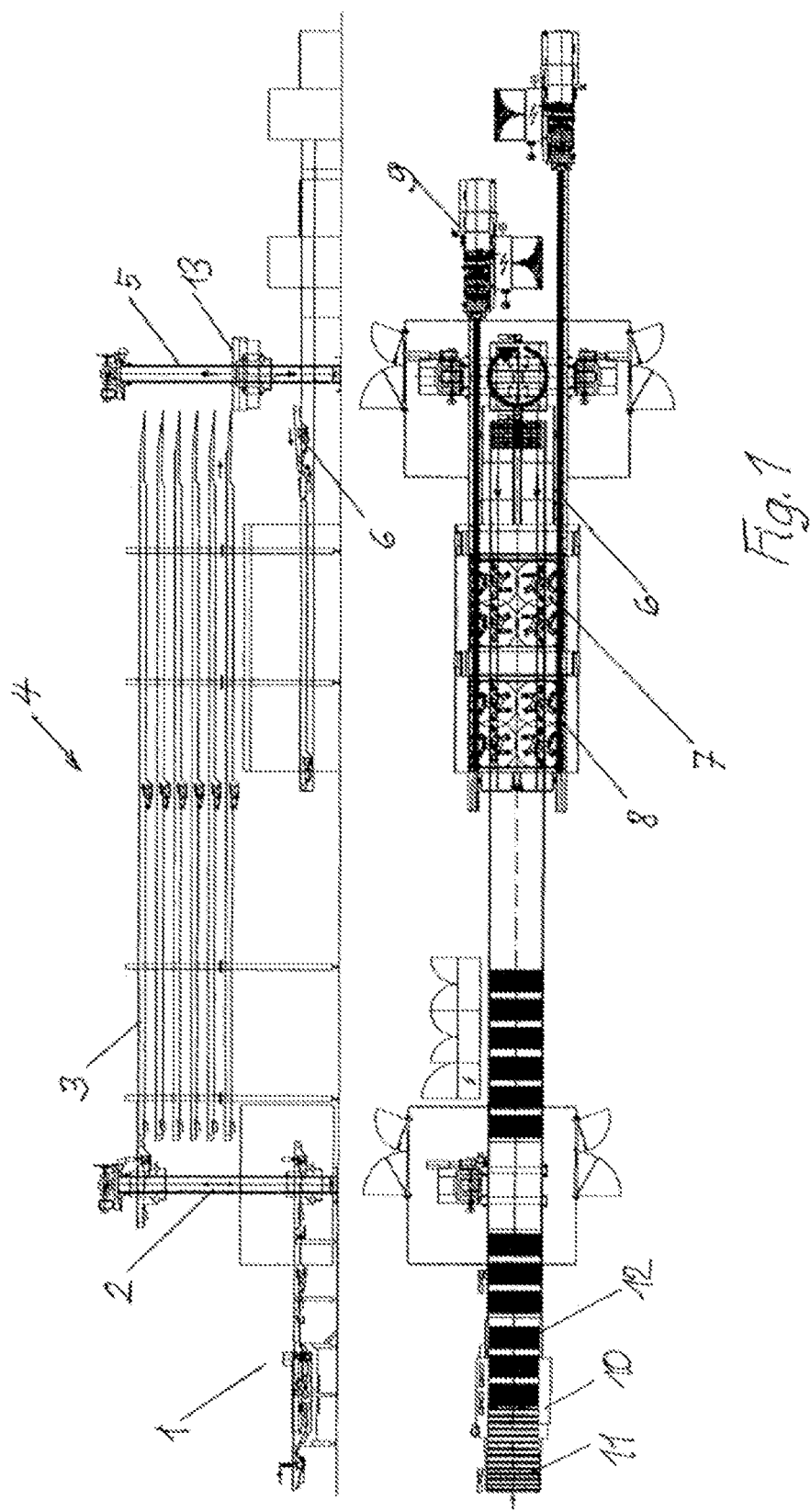

(58) Field of Classification Search
USPC .......................................... 198/347.7, 347.4
See application file for complete search history.

(56) References Cited

U.S. PATENT DOCUMENTS

| | | | | |
|---|---|---|---|---|
| 9,409,728 B2* | 8/2016 | Bastian, II | ............. | B65G 47/69 |
| 9,676,562 B2* | 6/2017 | Philipp | ................ | B65G 47/643 |
| 2004/0016679 A1 | 1/2004 | Schieleit | | |

FOREIGN PATENT DOCUMENTS

| | | |
|---|---|---|
| EP | 2 746 193 A1 | 6/2014 |
| JP | 51-123592 U | 10/1976 |
| JP | 2010-47336 A | 3/2010 |
| JP | 2012-218904 A | 11/2012 |
| WO | WO 2019/049557 A1 | 3/2019 |

OTHER PUBLICATIONS

International Search Report, issued PCT/EP2020/067994, dated Oct. 7, 2020.

* cited by examiner

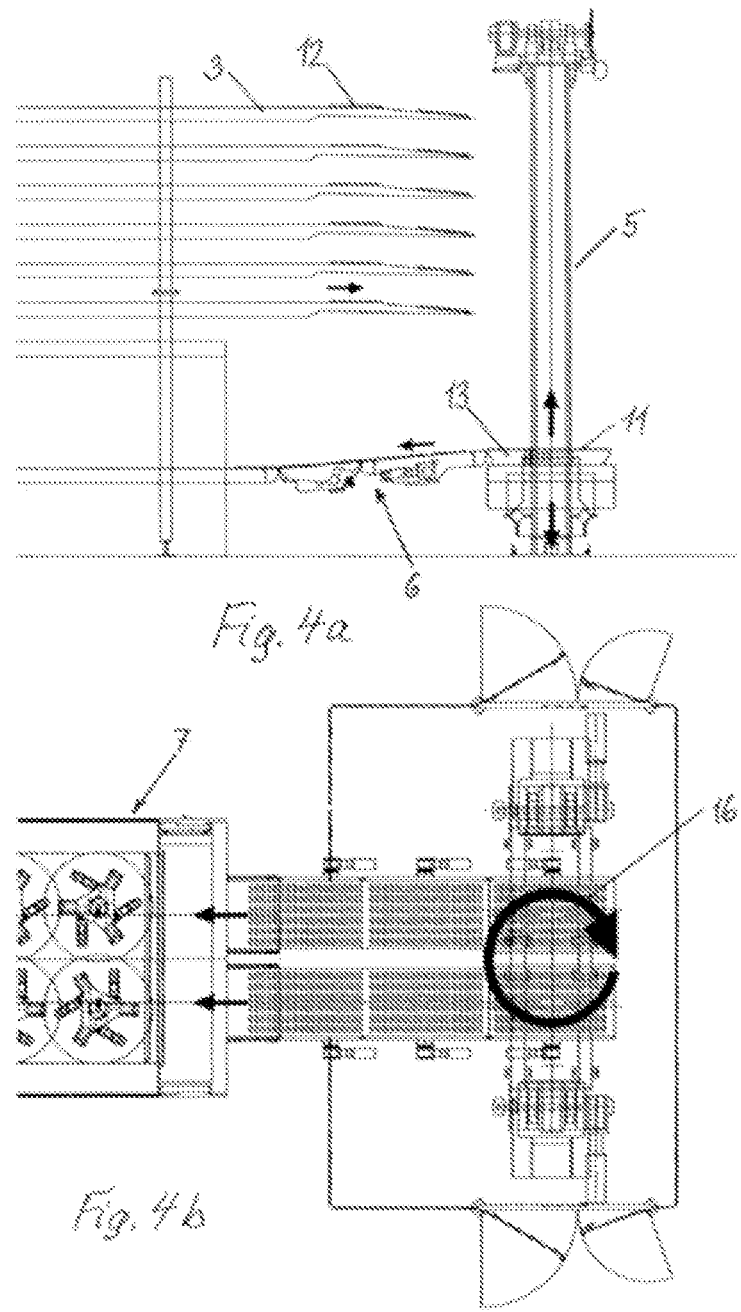

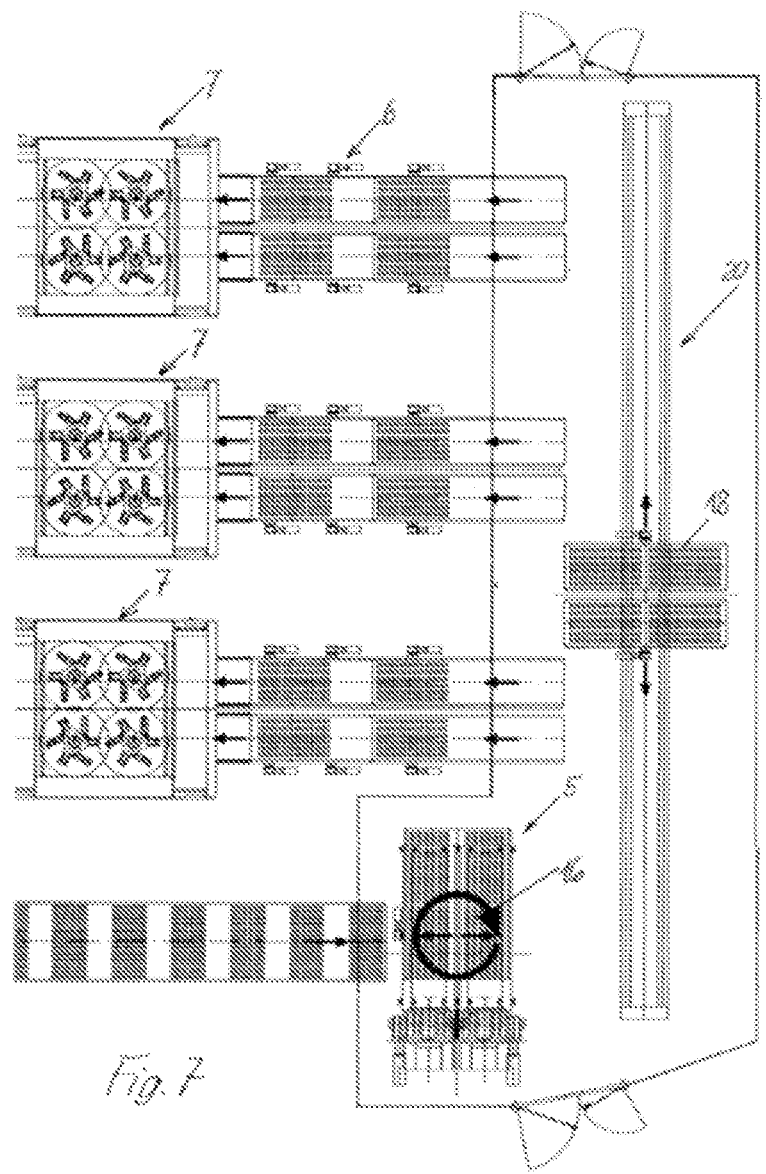

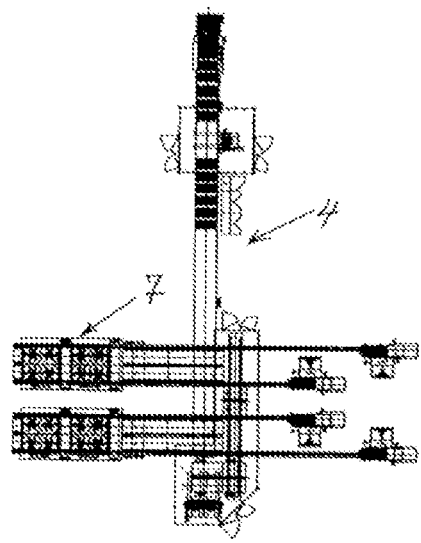
Fig. 9a
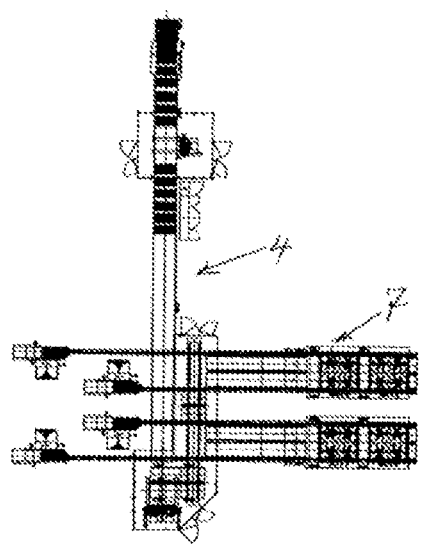
Fig. 9b
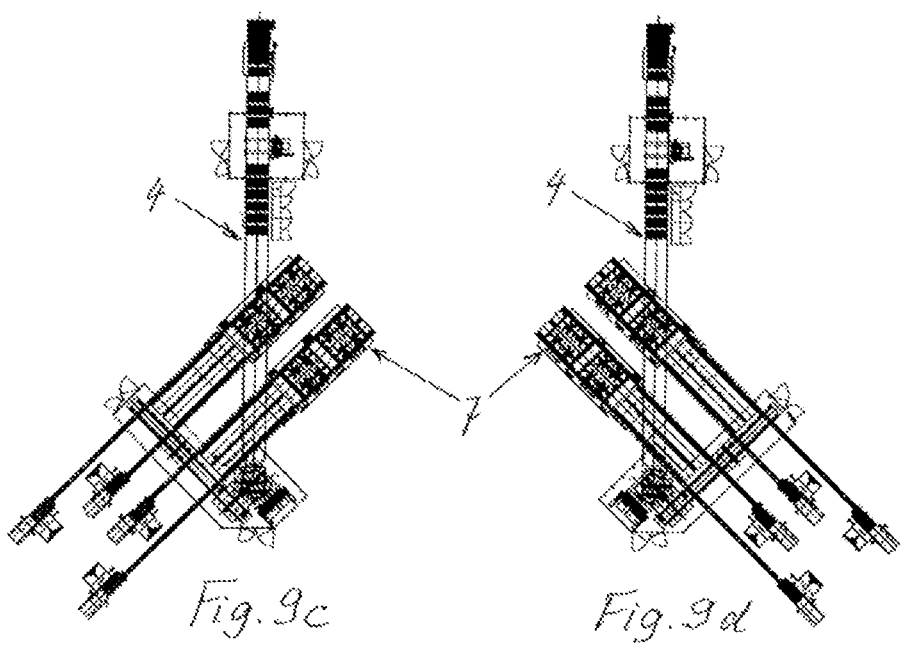
Fig. 9c
Fig. 9d

MULTI-TRACK LOADING OF PICK-AND-PLACE ROBOTS

The invention relates to the supply of products from an intermediate storage to pick-and-place robots.

In the packaging of individual food products in the confectionery sector, as well as in the frozen food sector, so-called pick-and-place robots, known per se, are used. The mostly small and unpackaged food products are supplied from the production to a main belt. These are, for example, biscuits straight from the oven, pralines or frozen mini pizzas, etc., hence smaller products lying flat on the main belt, which are supplied at a large individual product output rate. The products can lie on the main belt in rows or irregularly (chaotically).

In a typical packaging line, these products are supplied to the packaging arrangement via an intermediate storage. These intermediate storages are designed, for example, as multi-layer band storages. Hereby, several main belts are stacked as buffer belts. These buffer belts are supplied with product formations via a lifting device (lift), which is also equipped with a belt, or via a vertically pivoting main belt. These product formations are typically formed from the continuously arriving product flow using a so-called double pullnose band, known from the prior art. By means of a movable belt deflection, the same portion of products is always separated dynamically and alternately from the continuously arriving product flow and then transferred to the belt in the lift at a higher speed. A certain number of formations is loaded onto the belts in front of the lift, such that the entire length of the belt in the lift can then be filled in one cycle. The time re-suiting from the amount of product must be sufficient for the lift to carry out its cycle of upward and downward strokes, filling and emptying of the lift belt. The lift fills the stacked buffer belts at the inlet to the belt storage according to the first in-first out principle. The belt storage primarily serves to increase the efficiency of the entire packaging line, because, when the downstream packaging device stops, it can hold the corresponding amount of product from the oven until it is full. The buffer capacity corresponds to the total length of the stacked main belts. In addition, the buffer can also be used to cool the products, and the oven can also be emptied if the packaging device is stopped for a longer period of time. The required cooling time and the length of the oven must be included in the total length of the buffer.

At the outlet of the belt buffer, the product formations are supplied via a lift to one or more so-called picker cells, known per se, which contain pick-and-place robots arranged in series over a main belt and which in a multi-axis movement grab the products supplied to the main belt individually with a gripper in the flow and stack them on cycle chains arranged next to the main belt. These product stacks are then supplied by means of the cycle chains to downstream packaging machines. The number of pick-and-place robots connected one behind the other over a main belt depends primarily on the individual product output rate. Also, the consistency and size of the products play an important role.

In another embodiment, the picker cells consist of two parallel picker tracks, each with a lower, narrow main belt and there above multi-axis pick-and-place robots arranged in a row. After the storage, the product formations are distributed and supplied to a corresponding number of picker tracks depending on the output rate. The width of the formations is matched to the width of the picker tracks. With two-track picker cells, the speed of the two main belts under the pick-and-place robots can be controlled independently of one another. The speed can vary as it depends on the availability of the assigned pick-and-place robots.

When pick-and-place robots fail, the speed of the main belt can be reduced and the product input from the belt storage can be reduced accordingly. In this way, the pick-and-place robots cannot be overfed and there is no systematic overflow of product. Traditional picker cells from the prior art have only one main belt and, above it, two rows with pick-and-place robots. If pick-and-place robots fail, additional stand-by robots have to take over here.

However, if more pick-and-place robots fail than stand-by robots are available, an overflow will arise or the packaging output rate has to be reduced. Thus, two-track pick-and-place robot cells have the advantage that they can do without additional stand-by robots, because both tracks are independent of one another and do not negatively affect one another. For these reasons, two-track picker cells can cope with the output rate with a significantly lower number of pick-and-place robots and also generate even less product loss.

In order for the pick-and-place robots to recognize and track each individual product, it must be ensured that each individual product is clearly visible positioned on the main belt. This means that each individual product must have a defined distance from its neighbouring products. Thus, in reality, the products must not touch. In arrangements according to the state of the art, the product formations are often transversely transported and are also supplied over curved belts before they arrive at the respective pick-and-place robots. This increases the risk that the products will slip within the formations and thus touch one another. Therefor so-called spreading bands must be localized in front of each pick-and-place robot cell. These spreading belts can increase the distance between the products at right angles to the conveying direction and thus ensure that the products no longer touch each other. In the conveying direction, a small increase in speed on the belts in front of the pick-and-place robot cells is sufficient to pull the products apart. However, spreading belts and curved belts are expensive special belts. Often there is not enough space to install them, and hence additional bands have to be used to create the necessary space. These circumstances make a conventional supply to pick-and-place robots according to the prior art expensive and inaccessible.

The object of the invention is to simplify the supply to the picker cells and thus to build in a more cost-effective and space-saving manner.

According to the invention, this is achieved by a supply with the characterizing features of claim 1. The solution according to the invention represents a flexible and modular alternative for the feed.

Figure 2:
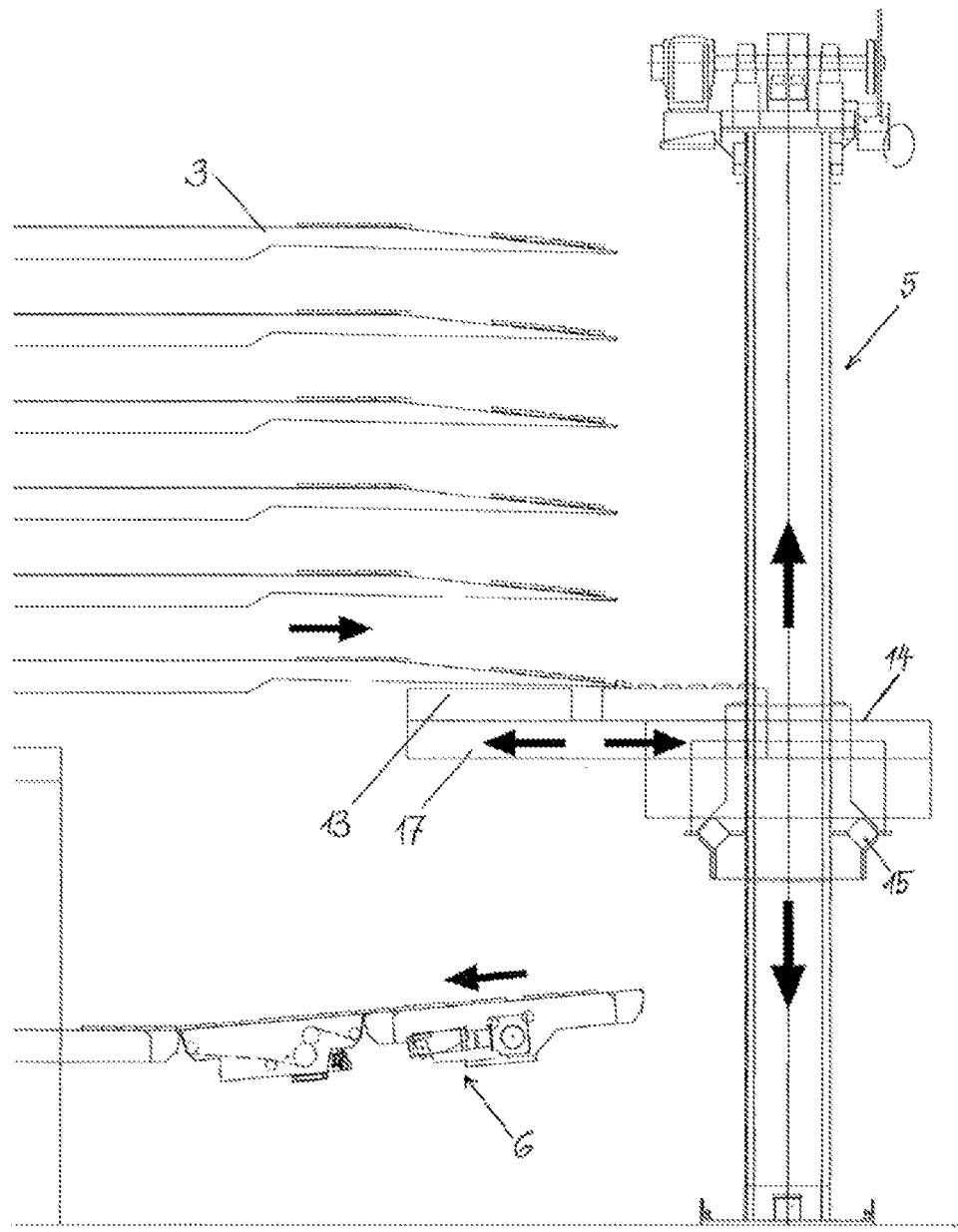
Figures 3A, 3B:
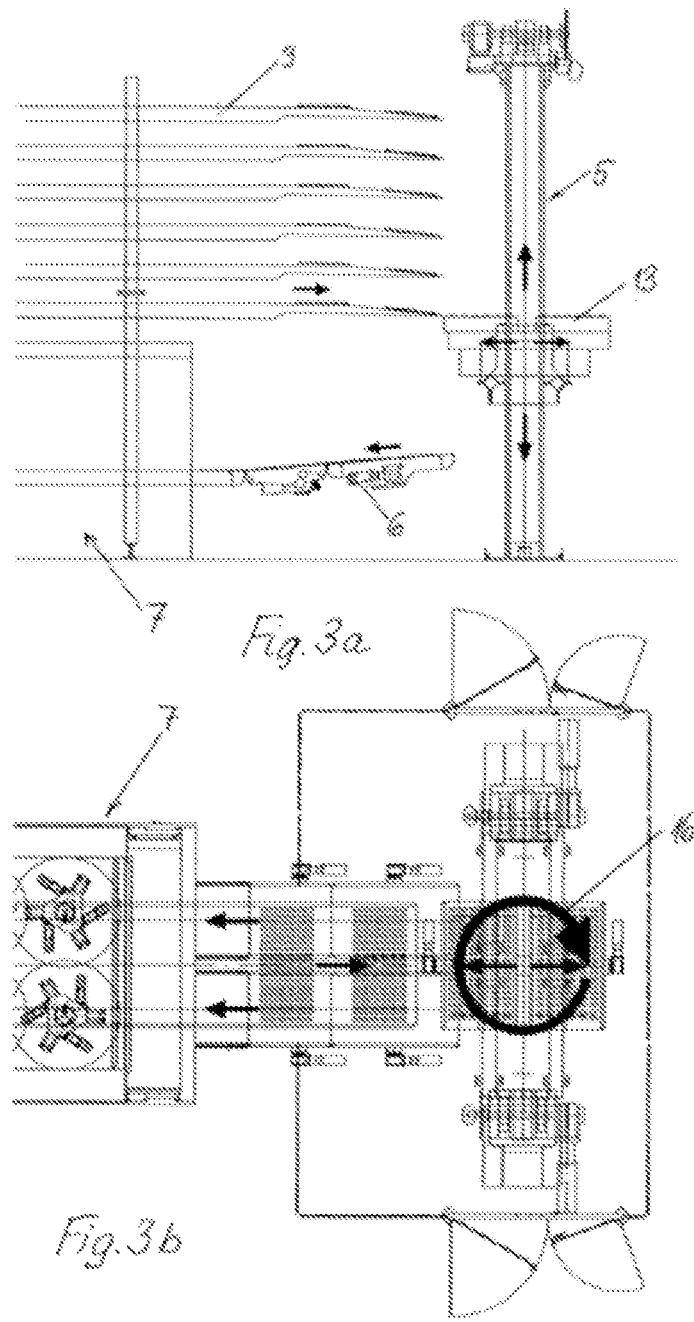
Figures 8A, 8B:
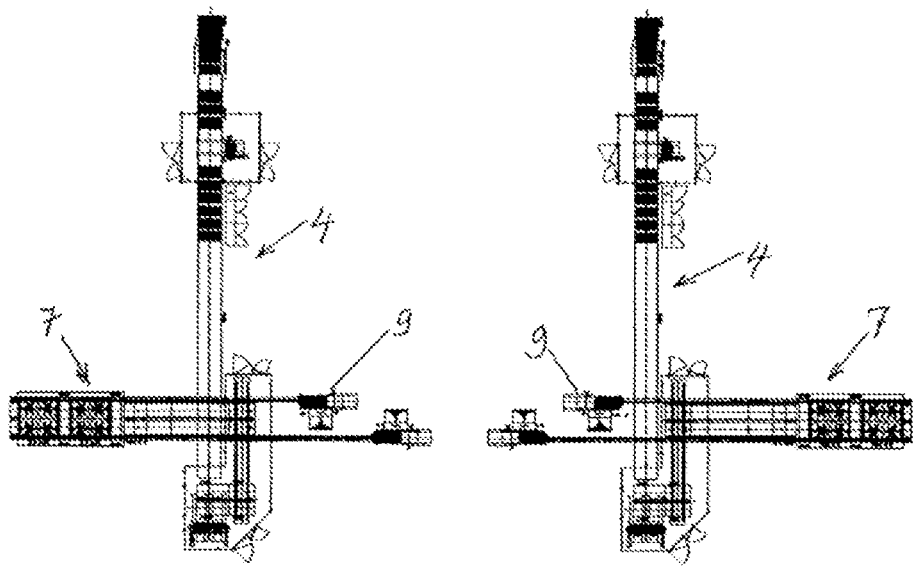
Figures 8C, 8D:
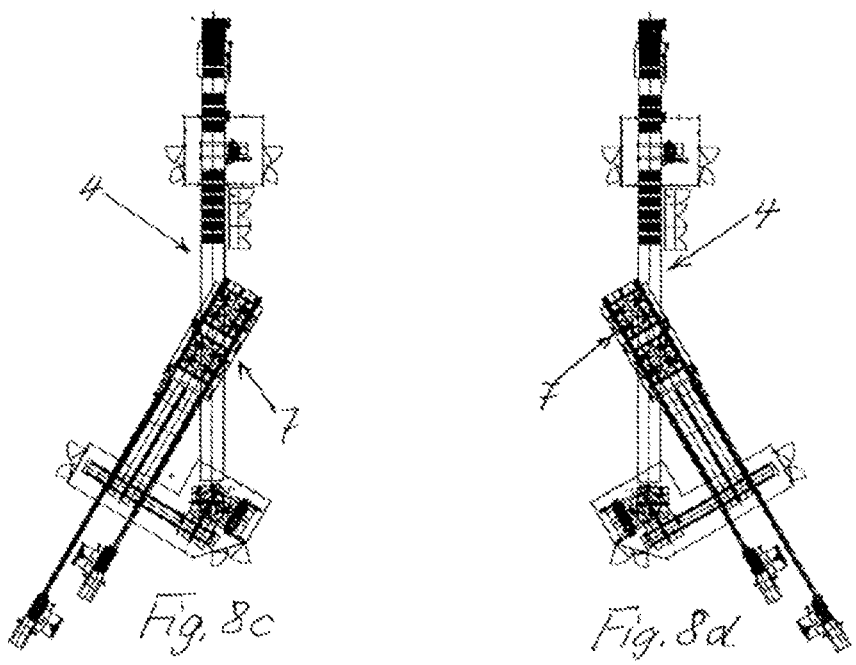

In the following, preferred exemplary embodiments of the invention are described with reference to the accompanying drawings. There is shown:

FIG. 1 side view and top view of an entire arrangement from the supply to an intermediate storage to the packaging, FIG. 2 is a detailed view of a lift arrangement on the outlet side of the intermediate storage, FIG. 3, 4 side view and top view of a supply from the intermediate storage to the pick-and-place device in two states, FIG. 5-7 side views and top view of the supply from the intermediate storage to alternative embodiments of the pick-and-place device, FIG. 8, 9 top views of different arrangement variants of the supply from the intermediate storage to the pick-and-place device.

The arrangement shown in FIG. 1 consists of a supply belt 1 on which the products arrive from the production, an inlet-side lifting device 2 with which the products are brought onto the individual buffer belts 3 of an intermediate buffer 4, an outlet-side lifting device 5 with which the products are brought from the intermediate storage to a supply device 6, with which the products are conveyed to a pick-and-place device 7, and of transport chains 8, on which the products stacked in the pick-and-place device are conveyed to packaging devices 9.

The supply belt 1 consists, in a manner known per se, of a number of belt modules, one of which is a so-called double pullnose belt 10, with which the continuously arriving product rows 11 are grouped into product formations 12. Supply belts of this type are known in the prior art.

The inlet-side lifting device 2, with which the product formations are brought onto the buffer belts 3 of the intermediate storage 4, corresponds, like the intermediate storage itself, to the devices of this type known from the prior art. Instead of with a lifting device, the belts of the intermediate storage can also be fitted with vertically pivotable belts.

The outlet-side lifting device 5, hereinafter referred to, for the sake of simplicity, as a lift, is equipped in a manner known per se with conveyor belts (lift belts) 13. The number and arrangement of the lift belts is determined according to the number and output rate of the downstream picker tracks.

The lift belts 13 are arranged on a height-adjustable platform 14 of the lifting device. A turntable 15 is integrated into this platform, by means of which the lift belts can be rotated as a whole about the vertical axis of the lifting device, as indicated by the arrow 16 in FIG. 3 and following. In addition, the lift belts are designed to be horizontally movable on the turntable by means of telescopic rails 17. The lift belts can thus be raised and lowered, rotated and moved horizontally. With these properties, the high-level buffer belts can be approached with pinpoint accuracy, in that the lift belts can be positioned by means of the telescopic rails under the flat-shaped outlet-side belt noses of the respective buffer belts. FIG. 3 shows the situation in which the platform assumes a position in which the belts 13 have been moved under the belt nose of the lowermost buffer belt and are filled with products. FIG. 4 shows the situation in which the platform is in its lowest position, in which the products are transferred to the supply device to the pick-and-place device.

When the product formations are transferred from the buffer belts of the intermediate storage to the lifting device, the direction of travel of the lift belts is transverse to the main conveying direction of the buffer belts. The product formations are conveyed from the buffer belts to the lift belts of the lifting device arranged below. The lift belts are shifted in the conveying direction of the buffer belts at a slightly higher speed than the respective buffer belt is conveying, such that the products are positioned on the lift belts with a defined greater distance from one another. The product formations are already spread out at the transition from the buffer belt to the lift belts. During this process, the lift belts are stopped. After the loading process of the lift belts has been completed, the lift belts are centred on the lift. The lift belts are now moved vertically downwards with the lift. During this, the lift belts rotate by a maximum of 90° and can then in the lower loading level directly inline load the supply to the subsequent pick-and-place robots, which may optionally be provided with dam-up belts and gap closing belts.

The required angle of rotation can be freely selected between 0° and 90° and follows the position of the pick-and-place device. In the arrangement shown in FIGS. 1-4, the pick-and-place device 7 is arranged centrally below the belt buffer. In order to be able to load this pick-and-place device with product at the loading level below, optionally using the dam-up and gap closing belts, the lift belts must be rotated by 90°. This also applies when the pick-and-place device is centrally arranged downstream, i.e. in the conveying direction of the buffer belts, of the belt buffer, or when a second pick-and-place device is centrally located opposite the one below the intermediate storage.

In FIGS. 5-7, arrangements are shown in which one or more pick-and-place devices are not centrally arranged with respect to the belt buffer or the lifting device. In these arrangements, a product transfer unit is used. For this purpose, the necessary number of conveyor belts 18 on one or two levels are mechanically accommodated on a sledge 19, and are designed to be horizontally movable by means of a guide unit 20 driven by an electric motor. These conveyor belts 18 are connected directly downstream the lift belts and can take up the amount of product formations 1:1 from the lift belts. With this product transfer unit, the product formations can be positioned directly for the individual pick-and-place robot cells.

Figure 5A:
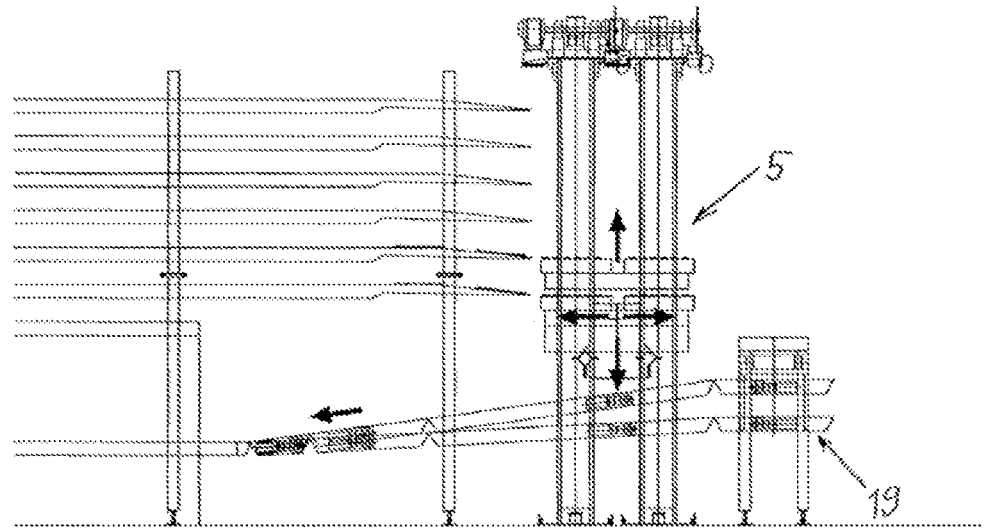
Figure 5B:
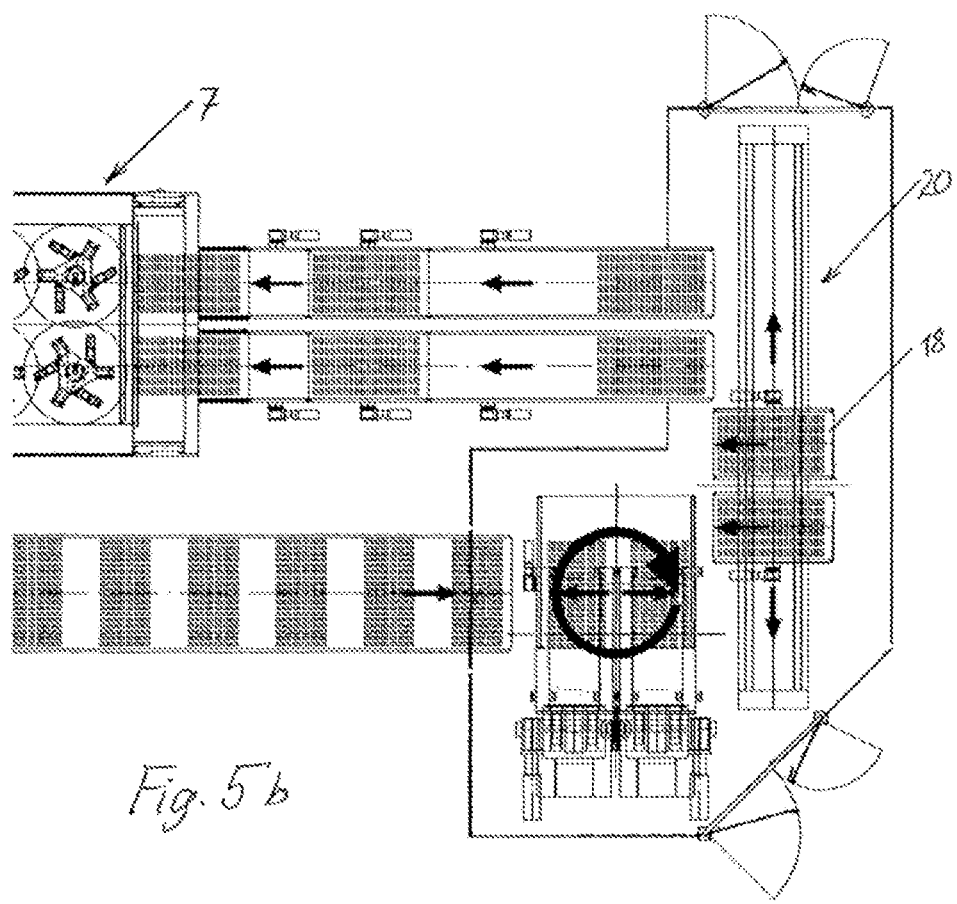
Figure 6A:
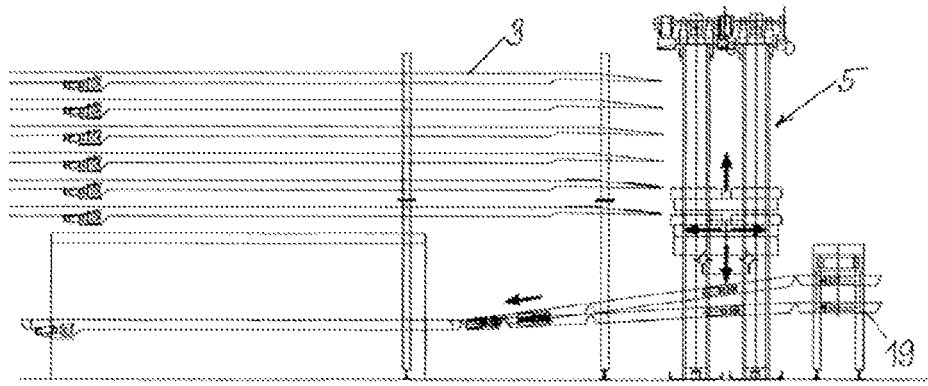
Figure 6B:
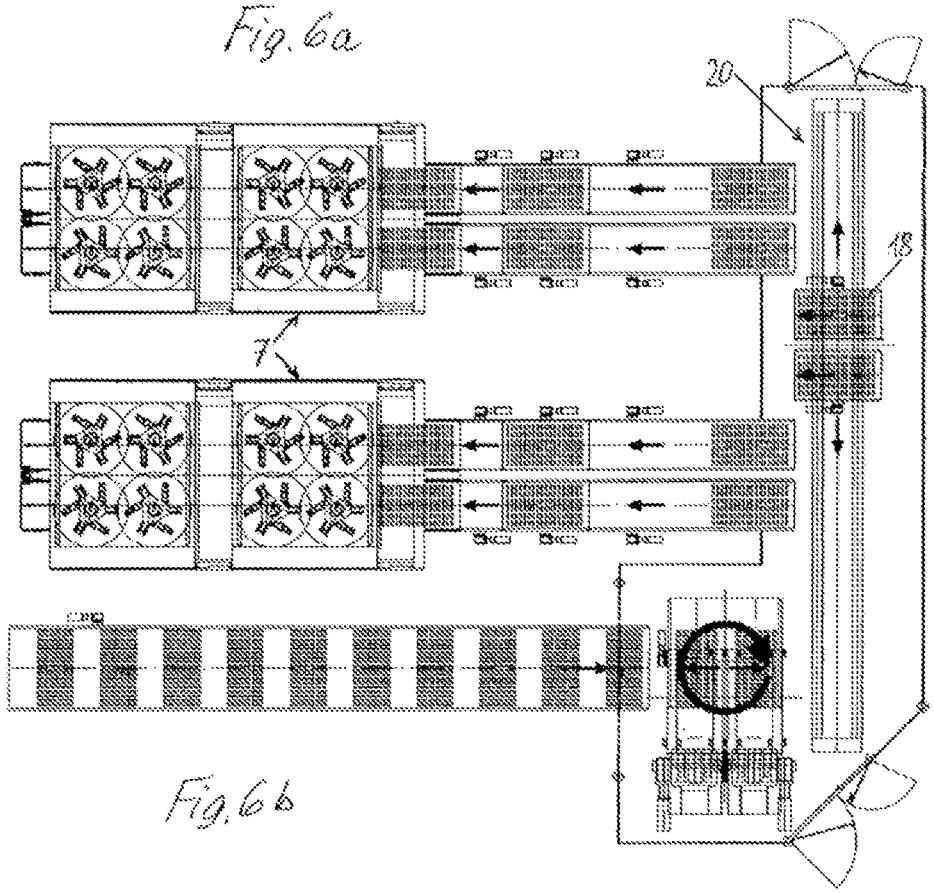

FIG. 5a shows a side view and FIG. 5b shows a top view of a arrangement in which the pick-and-place devices are arranged next to the intermediate storage. As the side view shows, the lifting device is provided with two stacked pairs of conveyor belts, each of which is responsible for loading a pick-and-place robot track. FIG. 6a shows a side view and FIG. 6b shows a top view of a arrangement in which two pick-and-place devices arranged in parallel are located next to the intermediate storage. The lifting device also has two stacked pairs of conveyor belts, from which the products are allocated to selected tracks of the pick-and-place devices by means of the transfer device. FIG. 7 shows a top view of an arrangement with three pick-and-place devices arranged in parallel next to the intermediate storage.

The allocation to the individual pick-and-place robot tracks is carried out by the availability notification of upstream dam-up and gap closing belts. This means that all pick-and-place robot tracks are continuously supplied with product in accordance with their output rate. Overfeeding is excluded, as well as an undersupply of product.

In FIGS. 8a, 8b, 9a and 9b, arrangements are shown in which pick-and-place devices are arranged offset by 90° to the conveying direction of the buffer belts and centrally to the lift. With this arrangement, the lift belts do not have to be rotated before the pick-and-place device can be loaded with product.

In FIGS. 8c, 8d, 9c and 9d, arrangements are shown in which pick-and-place devices are arranged offset by an angle between 0° and 90° to the conveying direction of the buffer belts. With this arrangement, before the pick-and-place device can be loaded with product, the lift belts must be rotated through an offset corresponding to the angle.

Whether the arrangement shown in FIG. 1-3 or the arrangements shown in the other figures are used depends on the respective space conditions and output rate requirements of the production and packaging arrangement.

With the proposed solution, several multi-track pick-and-place devices can be loaded with product formations from an intermediate storage without having to rely on curved belts and spreading belts. In addition, the pick-and-place devices can be positioned in almost any position in the outlet area of the belt storage arrangement, and can be flexibly and efficiently loaded with product via the lifting device and, optionally, via the product transfer unit.

Another advantage of the solution according to the invention is that pick-and-place devices to be loaded and a downstream packaging arrangement can be located on an upper or lower level or floor, since pick-and-place devices arranged there can also be easily served with product formations using the lifting device.

The invention claimed is:

1. A loading device in a packaging line for feeding unpacked product formations from an intermediate storage comprising buffer belts arranged on several levels to one or more multi-track-pick and place devices, comprising:
   a lifting device arranged at the outlet of the intermediate storage with a height-adjustable platform,
   lift conveyor belts on the lifting device taking the product formations from the buffer belts to at least two parallel subsequent conveyor belts of the one or more multi-track-pick and place devices are arranged on the platform, and
   wherein the lift conveyor belts are horizontally movable in the conveying direction of the buffer belts.

2. The loading device according to claim 1, wherein the lift conveyor belts of the lifting device are rotatably arranged on the platform.

3. The loading device according to claim 2, wherein the lift conveyor belts of the lifting device comprise two belts arranged one behind the other, which as a whole are horizontally movable and rotatable.

4. The loading device according to claim 1, wherein two pairs of conveyor belts are superimposably stacked on the lifting device, which together are horizontally movable and rotatable.

5. The loading device according to claim 1, wherein a further pair of conveyor belts or two superimposably stacked pairs of conveyor belts are connected directly downstream of the belts on the lift, and are designed to be horizontally movable by means of a guide unit driven by an electric motor.

6. The loading device according to claim 1, wherein the outlet-side end deflections of the buffer belts of the intermediate storage are each formed flat and wing-shaped.

7. The loading device according to claim 2, wherein two pairs of conveyor belts are superimposably stacked on the lifting device, which together are horizontally movable and rotatable.

8. The loading device according to claim 3, wherein two pairs of conveyor belts are superimposably stacked on the lifting device, which together are horizontally movable and rotatable.

9. The loading device according to claim 2, wherein a further pair of conveyor belts or two superimposably stacked pairs of conveyor belts are connected directly downstream of the lift conveyor belts on the lifting device, and are designed to be horizontally movable by means of a guide unit driven by an electric motor.

10. The loading device according to claim 2, wherein the outlet-side end deflections of the buffer belts of the intermediate storage are each formed flat and wing-shaped.

11. The loading device according to claim 3, wherein a further pair of conveyor belts or two superimposably stacked pairs of conveyor belts are connected directly downstream of the lift conveyor belts on the lifting device, and are designed to be horizontally movable by means of a guide unit driven by an electric motor.

12. The loading device according to claim 3, wherein the outlet-side end deflections of the buffer belts of the intermediate storage are each formed flat and wing-shaped.

13. The loading device according to claim 4, wherein a further pair of conveyor belts or two superimposably stacked pairs of conveyor belts are connected directly downstream of the lift conveyor belts on the lifting device, and are designed to be horizontally movable by means of a guide unit driven by an electric motor.

14. The loading device according to claim 4, wherein the outlet-side end deflections of the buffer belts of the intermediate storage are each formed flat and wing-shaped.

15. The loading device according to claim 5, wherein the outlet-side end deflections of the buffer belts of the intermediate storage are each formed flat and wing-shaped.

16. The loading device according to claim 5, wherein the lift conveyor belts are horizontally movable with respect to the platform.

17. The loading device according to claim 5, wherein the lift conveyor belts extend outwardly from the platform.

* * * * *